(12) United States Patent
Kulkarni et al.

(10) Patent No.: US 12,416,546 B2
(45) Date of Patent: Sep. 16, 2025

(54) SLURRY-BASED DUST INJECTION SYSTEM

(71) Applicant: General Electric Company, Schenectady, NY (US)

(72) Inventors: Ambarish J. Kulkarni, Glenville, NY (US); Byron A. Pritchard, Loveland, OH (US); Bernard P. Bewlay, Niskayuna, NY (US); Keith A. Lauria, Wells, NY (US); Meenakshi Kodali, Troy, NY (US); Michael R. Mutchler, Cincinnati, OH (US); Daniel Ellestad, West Union, OH (US); Geoffrey Eadon, Ballston Spa, NY (US); Aaron P. Bloomfield, Cincinnati, OH (US)

(73) Assignee: General Electric Company, Evendale, OH (US)

( * ) Notice: Subject to any disclaimer, the term of this patent is extended or adjusted under 35 U.S.C. 154(b) by 175 days.

(21) Appl. No.: 18/205,722

(22) Filed: Jun. 5, 2023

(65) Prior Publication Data

US 2024/0402046 A1    Dec. 5, 2024

(51) Int. Cl.
*G01M 15/14*    (2006.01)
*B05B 7/14*    (2006.01)

(52) U.S. Cl.
CPC ........... *G01M 15/14* (2013.01); *B05B 7/1431* (2013.01)

(58) Field of Classification Search
CPC .................................................. G01M 15/14
See application file for complete search history.

(56) References Cited

U.S. PATENT DOCUMENTS

| | | | |
|---|---|---|---|
| 6,254,267 B1 | 7/2001 | Arnaud | |
| 9,321,908 B2 | 4/2016 | Bhargava | |
| 9,651,469 B1 | 5/2017 | Weickert | |
| 9,714,967 B1 | 7/2017 | Weickert | |
| 10,073,008 B2 | 9/2018 | Weickert | |
| 10,960,367 B1 | 3/2021 | Lopresti | |
| 11,313,753 B2 * | 4/2022 | Holdmeyer | G01M 3/224 |
| 11,440,248 B2 | 9/2022 | Okamoto | |
| 2017/0343468 A1 * | 11/2017 | Lehman | G01N 17/02 |
| 2018/0354192 A1 | 12/2018 | Iwase | |
| 2020/0238567 A1 | 7/2020 | Nakamura | |

FOREIGN PATENT DOCUMENTS

| | | |
|---|---|---|
| CN | 110981463 | 4/2020 |
| FR | 3127024 | 3/2023 |
| FR | 3127025 | 3/2023 |
| FR | 3127269 | 3/2023 |
| FR | 3129375 | 5/2023 |

(Continued)

*Primary Examiner* — Eric S. McCall
(74) *Attorney, Agent, or Firm* — Hanley, Flight & Zimmerman, LLC

(57) ABSTRACT

A dust injection system for engine testing and related methods are provided. The system includes a carrier pipe that defines a fluid flow path between an inlet and an outlet and an injection nozzle disposed within the carrier pipe between the inlet and the outlet. The injection nozzle receives a slurry comprising dust particulates and a carrier liquid, and injects the dust particulates and the carrier liquid into the fluid flow path. The carrier liquid is atomized and evaporates in the fluid flow path prior to the outlet to enable dried version of the dust particulates to exit the outlet.

19 Claims, 7 Drawing Sheets

(56) References Cited

FOREIGN PATENT DOCUMENTS

| | | |
|---|---|---|
| FR | 3129428 | 5/2023 |
| FR | 3129432 | 5/2023 |
| FR | 3129436 | 5/2023 |
| FR | 3129690 | 6/2023 |
| FR | 3129970 | 6/2023 |
| FR | 3129972 | 6/2023 |
| FR | 3130313 | 6/2023 |
| FR | 3130323 | 6/2023 |
| FR | 3130747 | 6/2023 |
| FR | 3130874 | 6/2023 |
| FR | 3130875 | 6/2023 |
| FR | 3130877 | 6/2023 |
| FR | 3130879 | 6/2023 |
| FR | 3130894 | 6/2023 |
| FR | 3130895 | 6/2023 |
| FR | 3130896 | 6/2023 |
| FR | 3130897 | 6/2023 |
| FR | 3132279 | 8/2023 |
| FR | 3132729 | 8/2023 |
| FR | 3132743 | 8/2023 |
| FR | 3133367 | 9/2023 |
| FR | 3133368 | 9/2023 |
| WO | 2022011456 | 1/2022 |

\* cited by examiner

700 ↘

702 — Activate A Pump To Supply A Slurry Of Carrier Liquid And Dust Particulates From A Tank To An Injection Nozzle 704 — Atomize The Carrier Liquid 706 — Inject The Dust Particulates And Carrier Liquid Into A Fluid Flow Path Defined Between An Inlet And An Outlet Of A Carrier Pipe With The Injection Nozzle

FIG. 7

SLURRY-BASED DUST INJECTION SYSTEM

TECHNICAL FIELD

These teachings relate generally to testing systems for jet engines and more particularly to a slurry-based dust injection system.

BACKGROUND

Dust injection systems are utilized to test jet engine performance. In particular, these systems are utilized to inject a controlled amount of dust into operating jet engines to measure and observe performance of the engines under common dust loading situations the engine is likely to encounter in the field. Typical dust injection systems utilize an auger feed mechanism to transfer dry dust particulate into an air-based transport system that delivers the dust to the intake of the operating engine.

BRIEF DESCRIPTION OF THE DRAWINGS

Various needs are at least partially met through provision of the slurry-based dust injection system described in the following detailed description, particularly when studied in conjunction with the drawings. A full and enabling disclosure of the aspects of the present description, including the best mode thereof, directed to one of ordinary skill in the art, is set forth in the specification, which refers to the appended figures, in which:

FIG. 7 comprises a flow diagram for an operating method for a dust injection system as configured in accordance with various embodiments of these teachings.

Figure 1:
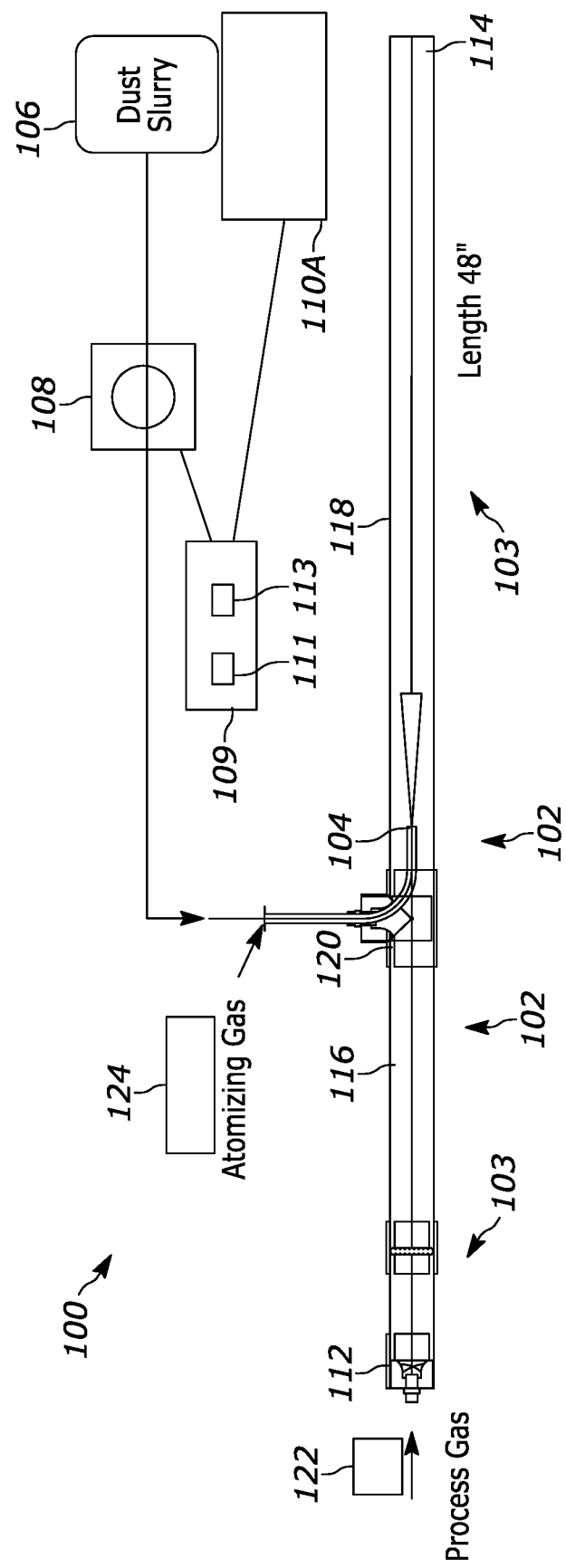
FIG. 1 shows a schematic diagram of a dust injection system as configured in accordance with various embodiments of these teachings.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present teachings. Also, common but well-understood elements that are useful or necessary in a commercially feasible embodiment are often not depicted in order to facilitate a less obstructed view of these various embodiments of the present teachings. Certain actions and/or steps may be described or depicted in a particular order of occurrence while those skilled in the art will understand that such specificity with respect to sequence is not actually required.

DETAILED DESCRIPTION

The terms and expressions used herein have the ordinary technical meaning as is accorded to such terms and expressions by persons skilled in the technical field as set forth above except where different specific meanings have otherwise been set forth herein. The word "or" when used herein shall be interpreted as having a disjunctive construction rather than a conjunctive construction unless otherwise specifically indicated. The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

As used herein, the terms "first" and "second" may be used interchangeably to distinguish one component, flow rate, etc. from another and are not intended to signify location or importance of the individual components, flow rates, etc.

The terms "upstream" and "downstream" refer to the relative direction with respect to fluid flow in a fluid pathway. For example, "upstream" refers to the direction from which the fluid flows, and "downstream" refers to the direction to which the fluid flows.

Approximating language, as used herein throughout the specification and claims, is applied to modify any quantitative representation that could permissibly vary without resulting in a change in the basic function to which it is related. Accordingly, a value modified by a term or terms such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Auger-based dust feeder systems generally include a dry dust hopper, an auger, a thumper/agitator, an auger isolation valve, and a control system. Often, the design of the auger-based dust feeder is specific to engine type. The auger-based dust injection systems suffer from inaccurate and inconsistent dust feed rates, especially at lower feed rate values. In particular, the auger systems needed to account for varying environmental conditions (e.g., humidity) result in inherently unreliable operation such as dust clumping. Furthermore, these auger-based systems are subject to air leakage and have significant maintenance requirements to maintain functionality. For example, the thumper requires weld inspections. Dust flow per cycle is further based on calibration and is often still result in inaccuracy.

Generally speaking, the various aspects of the present disclosure provide a slurry-based dust injection system for engine testing. In some embodiments, a slurry-based dust injection system improves control over dust feed rate, reduces dust clumping, and reduces maintenance requirements. In some embodiments, the slurry-based system also allows for implementation of a real-time feedback control system not present in current auger-based feed systems. Furthermore, such a system can provide a measurable flow of dust and slurry per cycle, be utilizable for a wide range of engines, and can be retrofitted into existing auger-based systems.

Figure 3:
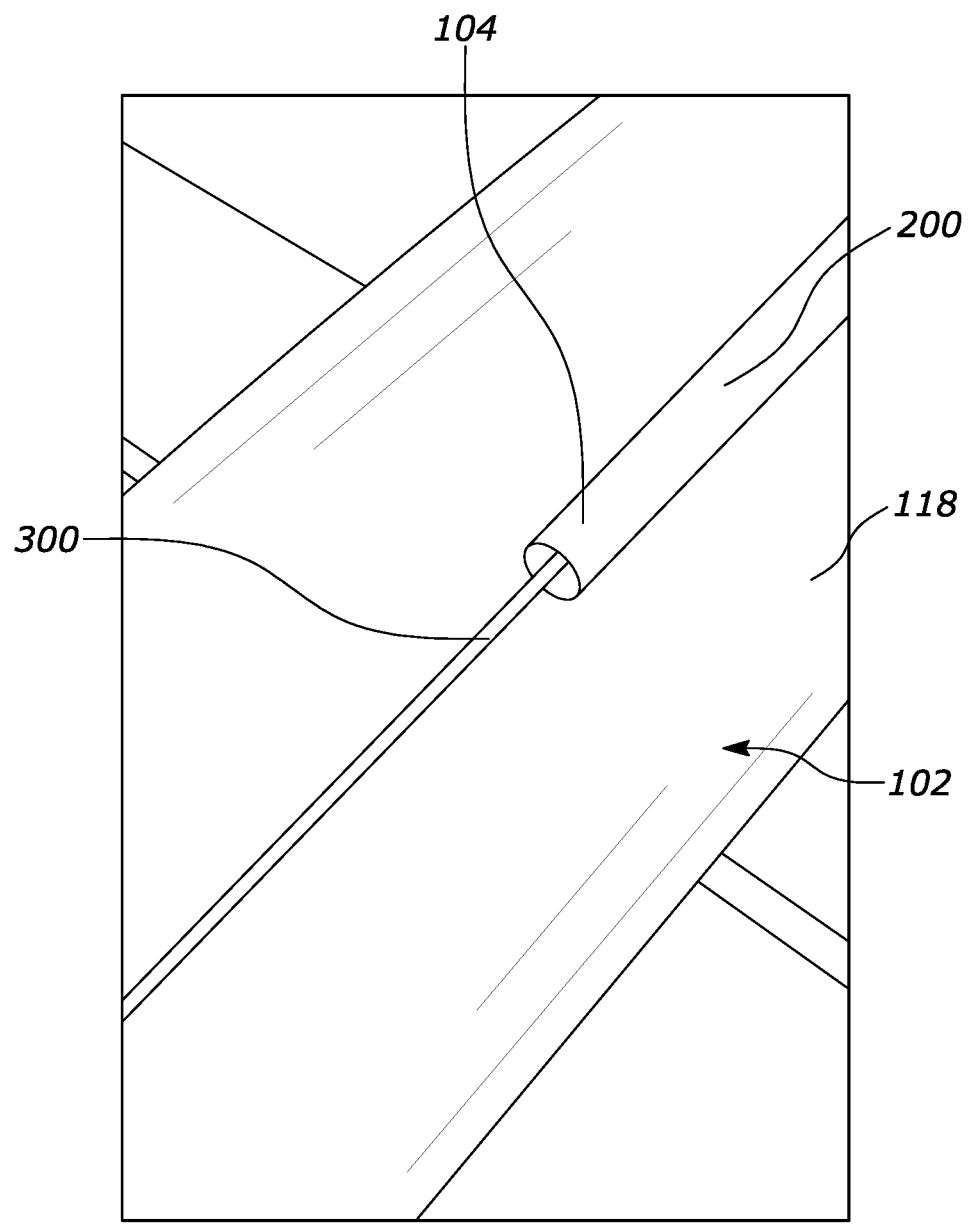
FIG. 3 shows a partial view of an atomizing nozzle in operation and as configured in accordance with various embodiments of these teachings.

The foregoing and other benefits may become clearer upon making a thorough review and study of the following detailed description. Referring now to the drawings, and in particular to FIG. 1, a dust injection test system 100 that is compatible with many of these teachings is presented. The dust injection test system 100 includes a carrier pipe 102, an injection nozzle 104, a tank 106 that holds a slurry mixture of dust particulates 300 (see FIG. 3) and carrier liquid, and a pump 108 in fluid communication with the tank 106 and the injection nozzle 104.

The dust injection test system 100 includes a controller 109 that is electrically coupled to the pump 108 and a sensor 110A. The controller 109 directs a first flow rate of the pump 108 based on user input received via a user interface 111 of the controller 109. The sensor 110A measures an indication of an amount of the dust particulates 300 flowing through the dust injection test system 100 and the controller 109 directs the first flow rate based on the measured indication of the amount of the dust particulates 300. In some embodiments, the controller 109 is integrated into the pump 108. However, the controller 109 can also include a stand-alone unit such as a distinct computer, microcontroller, FPGA, or other similar processing device known in the art. As seen in FIG. 1, the controller 109 can also include a non-volatile memory 113. In some embodiments, the flow rate of the pump 108 is modifiable by the controller 109 within a range from about 1 cubic centimeter per minute to about 100 cubic centimeters per minute.

The carrier pipe 102 defines a fluid flow path 103 between an inlet 112 and an outlet 114. In some embodiments, the carrier pipe 102 is formed from a first section 116 that includes the inlet 112, a second section 118 that includes the outlet 114, and a connector 120 between the first section 116 and the second section 118. The connector 120 can include a T-connector, Y-connector, or other suitable mechanical connector that joins the first section 116 and the second section 118. Furthermore, a first gas source 122 is coupled to the inlet 112 to provide a gas stream through the fluid flow path 103 and a second gas source 124 is coupled in fluid communication with the injection nozzle 104 to supply gas to the injection nozzle 104 for use in atomizing the carrier liquid. In some embodiments, the second gas source 124 provides a stream of higher pressured gas than the first gas source 122. For example, a pounds per square inch differential (PSID) of at least 15 PSI between the pressures of the gasses from first gas source 122 and the second gas source 124 can facilitate complete or near-complete evaporation of the carrier liquid within the flow path as described in more detail below. The first gas source 122 and the second gas source 124 can utilize air or other suitable gases to respectively set a moving direction of the fluid flow path 103 out of the outlet 114 and atomize the carrier liquid. In some embodiments, the injection nozzle 104 may comprise a plain-orifice nozzle, a shaped-orifice nozzle, a surface-impingement nozzle, a pressure-swirl spray nozzle, a solid-cone nozzle, a rotary atomizer, an electrostatic atomizer, an ultrasonic atomizer, or the like.

As seen in FIG. 2, the connector 120 includes a support bracket 204 that is coupled to and supports and positions the injection nozzle 104 within the carrier pipe 102 between the inlet 112 (FIG. 1) and the outlet 114 (FIG. 1). The support bracket 204 rests within an upper portion of the connector 120 and securely holds a gas supply pipe 200 through which a supply line 202 from the pump 108 (FIG. 1) is fed. In some embodiments, the carrier pipe 102 and connector 120 can be components of an engine testing system and the support bracket 204 is utilized for retrofitting those systems for use with the slurry mixture described herein.

The gas supply pipe 200 is in fluid communication with the second gas source 124 (FIG. 1) and the pump 108 delivers the slurry to the injection nozzle 104 via the supply line 202 at the direction of the controller 109 (FIG. 1). The slurry comprises dust particles suspended in a carrier liquid or fluid. The gas supply pipe 200 is connected to the injection nozzle 104 so that a gas supplied by the gas supply pipe 200 from the second gas source 124 interacts with the slurry to atomize the carrier liquid as the slurry is ejected from the injection nozzle 104. Then, the now atomized carrier liquid and dust particulates 300 are injected into the fluid flow path 103 as seen in FIG. 3. Specifically, the gas supplied by the first gas source 122 (FIG. 1) carries the dust particulates 300 out of the outlet 114. The first gas source 122 can be configured to provide an air flow rate in a range of about 0.1 to about 2.5 pounds per seconds. In some embodiments, the controller 109 can alter the flow rate of the air from the first gas source 122 and/or the second gas source 124 to deliver a desired amount of the dust particulates 300 out of the carrier pipe 102. In some embodiments, the carrier liquid also exits the outlet 114 in gas form. For example, the injection nozzle 104 causes the carrier liquid to evaporate within the fluid flow path 103, upstream of the outlet 114, and exit the outlet 114 in gas form along with the dust particulates 300. As such, a dried version of the dust particulates 300 exit from the outlet 114. The dust particulates 300 can include natural materials that are milled to size specifications of around 0-50 microns and combined in an engineered mineral composition to replicate dust found in nature in certain areas where aircraft engines operate.

In some embodiments, the pump 108 includes a peristaltic pump. However, other pump types such as a gear pump, eductor pump, etc. are also contemplated. A revolutions per minute (RPM) of the pump 108 can be varied to change a mL/min or lbs/min feed rate of the slurry to the injection nozzle 104. In some embodiments, the feed rate is in a range of 0.0004-0.01 lbs/min and can include an accuracy of +/−20%. In some embodiments, the pump 108 may include a fast ON/OFF response time of less than 1 s. The pump 108 can also be configured to provide a step change in the RPM between multiple settings and return to the same feed rate at each setting to allow for multiple dust feed rates in the same dust cycle. In some embodiments, a number of rollers of the pump 108 can be reduced to increase longevity of tubing used in the supply line 202. Lowering the number of rollers can produce a pulsing effect. However, the consistency of the pulsing does not affect the overall flow rate of the pump 108. Because wear and tear of the tubing can affect the feed rate, the tubing for the supply line 202 can configured to be easily replaced often as a part of maintenance cycle. Tubing manufactured from polypropylene based thermoplastic elastomers or similar, for example Norprene® tubing, PharMed® tubing, etc., have been found to provide longevity and low degradation over time when used to transport the slurry of the dust injection test system 100. In some embodiments, the tubing can also be configured with as few fittings and little routing as possible to avoid low spots and help keep dust from settling in the tubing.

To assist the injection nozzle 104 in causing the evaporation of the carrier liquid, the carrier liquid is selected to include rapid evaporation characteristics at the normal operating temperatures and pressures of the dust injection test system 100. As such, upon being atomized and injected into the fluid flow path 103, the carrier liquid evaporates to dry out the dust particulates 300 and enable the dust particulates 300 as dried to pass through the outlet 114. The carrier liquid can include any liquid with a relatively high vapor pressure compared to water under the normal ambient operating conditions of the dust injection test system 100. This increased vapor pressure when compared to water, enables the carrier liquid to readily evaporate while also remaining chemically inert. In some embodiments, the vapor pressure can be in a range of about 2.5 kilopascals to about 50 kilopascals. Additionally, the carrier liquid can have a flash point in a range of about-30 degrees Celsius to about 200 degrees Celsius. The carrier liquid also includes properties that provided chemical stability when intermixed with the dust particulates 300, for example, generally non-polar carrier liquids are better than polar carrier liquids. The carrier liquid can also be selected to reduce flammability and have a reasonable commercial cost and availability. In some embodiments, the carrier liquid includes a solvent such as ethanol. However, the carrier liquid can be other alcohols such as acetone, isopropyl alcohol, or similar carrier liquids known in the art. The atomization and rapid evaporation of the carrier liquid helps to reduce an amount that the carrier liquid and dust particulates 300 are deposited on an inside of the carrier pipe 102, which maximizes the amount of the dust particulates 300 that are ejected from the outlet 114. Beyond varying the flow rate of the pump 108, the feed rate of the dust particulates 300 can be controlled by the ratio of the carrier liquid to the dust particulates 300. For example, a ratio of the dust particulates 300 to 1 liter of the carrier liquid can be in a range of 0.05-0.05 pounds and/or 50-500 g of the dust particulates 300. Similarly, a mass ratio of the dust particulates to the carrier liquid in the slurry is in a range of 0.02-0.5 This ratio can also balance concerns of flammability vs the flowability/plugging of the supply line 202.

Furthermore, in some embodiments, additional control options and/or alert notifications can be included as part of the dust injection test system 100. For example, in some embodiments, the controller 109 can operate the pump 108 for fill time and reverse flow to limit settling of solids in low points when the pump 108 is not actively pumping. In some embodiments, the dust injection test system 100 can include an alarm that is triggered when the controller 109 determines there is a low-pressure value at the injection nozzle 104. Further still, in some embodiments, the controller 109 can monitor temperature drop due to evaporative cooling experienced across the injection nozzle 104 and use the measurement to determine whether the slurry is flowing from injection nozzle 104.

Figure 4:
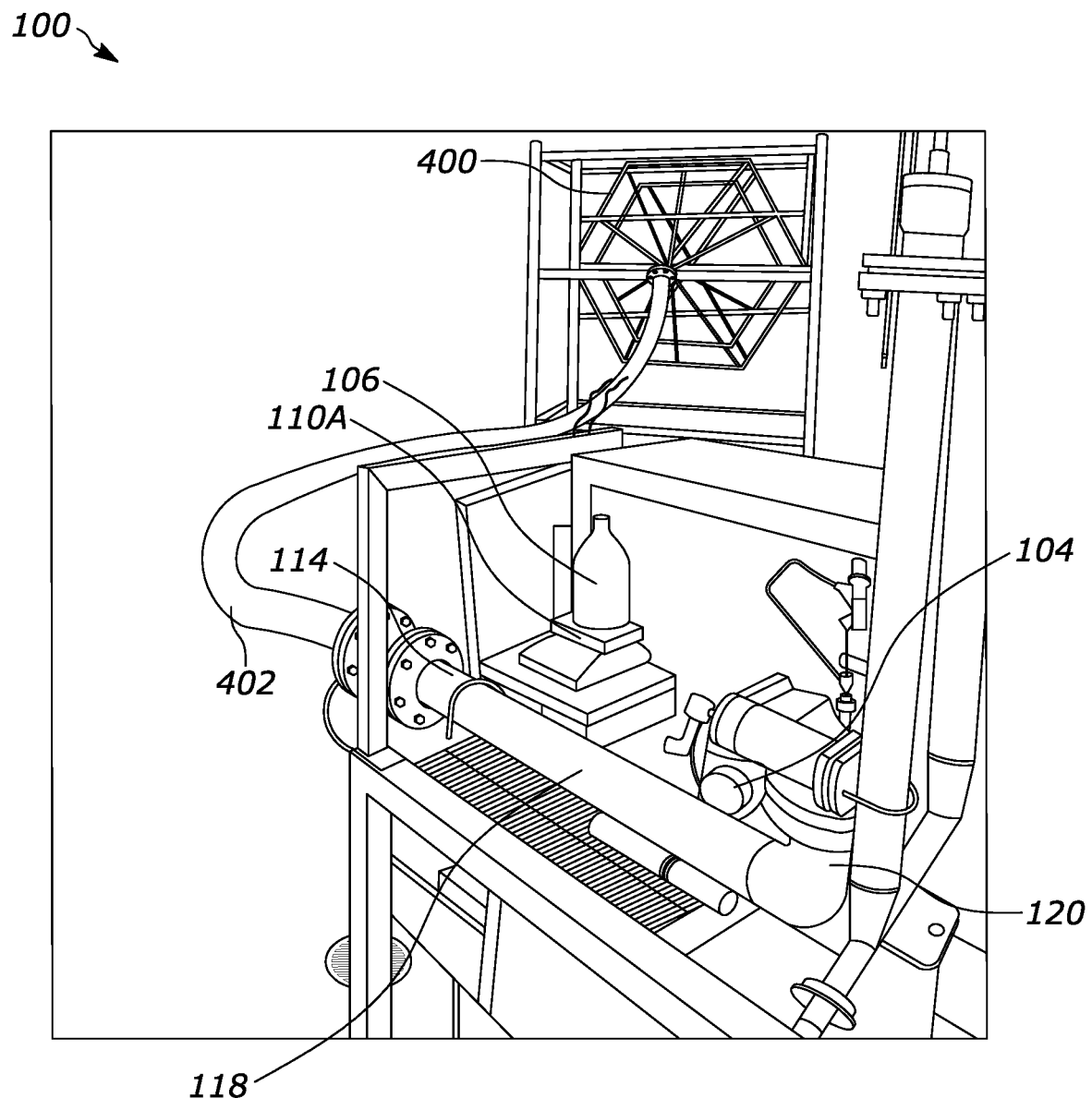
FIG. 4 shows a perspective view of a dust injection system as configured in accordance with various embodiments of these teachings.

Turning now to FIG. 4, it can be seen that the dust injection test system 100 can be coupled to a dust nozzle array 400 via a flexible tubing 402 coupled to the outlet 114. The dust nozzle array 400 receives and disperses the dust particulates 300 (FIG. 3) for placement relative to an air intake of a jet engine or the like undergoing dust particulate testing. Furthermore, as seen in FIG. 4, the sensor 110A can include a scale. In such embodiments, one indication of the amount of the dust particulates 300 flowing through the system 100 includes a weight of the tank 106 measured by the scale. In some embodiments, the scale can include an integrated magnetic stirrer, mechanical propellor, or the like for agitation and to maintain the mixture of the dust particulates 300 and liquid carrier liquid of the slurry within the tank 106. For example, the stirrer can be used to overcome dust settling by mechanical agitation via a spinning magnet in the slurry to create a vortex and keep a uniform suspension of dust. In some embodiments, the slurry can include stabilizers that reduce the need for agitation. Such stabilizers can include powered dispersants, solvent dispersants, reaction neutralizers, etc.

Figure 5:
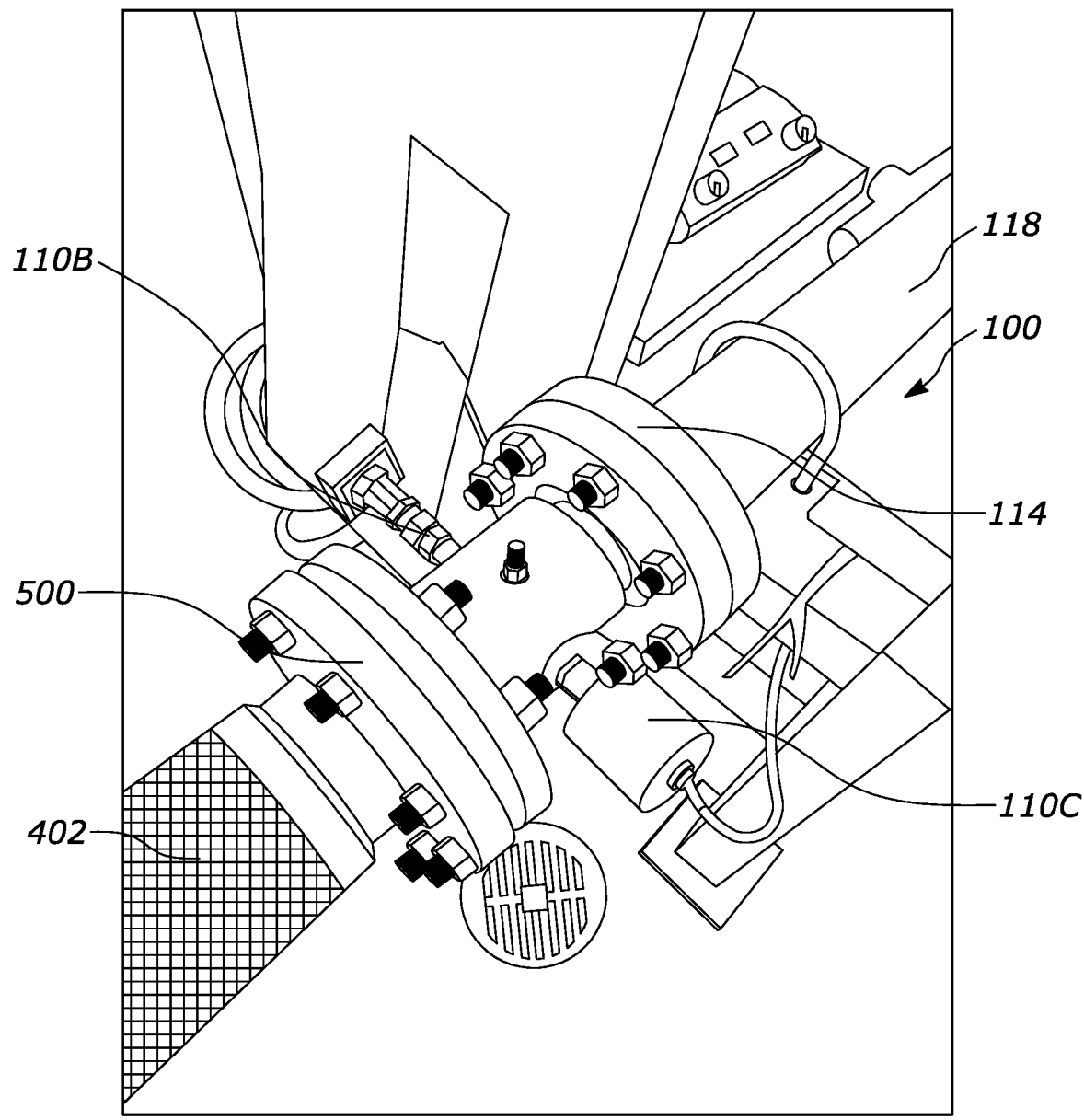
FIG. 5 comprises a partial perspective view of the dust injection system of FIG. 4.

As seen in FIG. 5, in some embodiments, the dust injection test system 100 can include an outlet collar 500 coupled to the outlet 114 and the flexible tubing 402. The outlet collar 500 can be used to couple additional sensors 110B and 110C to the outlet 114. The sensors 110B and 110C can include dust particulate sensors that measure the amount of the dust particulates 300 flowing out from the outlet 114. In some embodiments, an additional one or more sensors that measure the flow of the slurry through dust injection test system 100 can be included (e.g., between the tank 106 (FIG. 1) and the pump 108 (FIG. 1) and/or between the pump 108 and the injection nozzle 104 (FIG. 1)).

Figure 2:
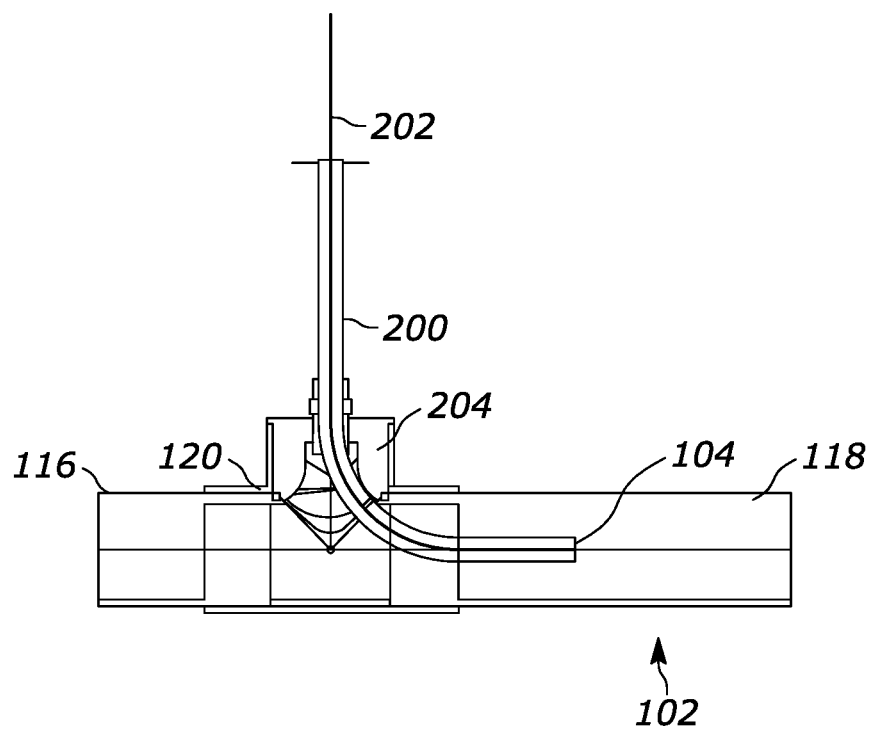
FIG. 2 shows a partial section of the schematic diagram of FIG. 1.

It will be appreciated that some or all of the components of the dust injection test system 100 can be provided as a retrofit kit for existing auger-based dust injection systems. For example, such a kit can include the injection nozzle 104, the tank 106, the pump 108, the support bracket 204 (FIG. 2), as well as other related components such as the controller 109 (FIG. 1), the sensors 110A (FIG. 1), 110B, 110C, the second gas source 124 (FIG. 1), the gas supply pipe 200 (FIG. 1), the supply line 202 (FIG. 1), etc.

Figure 6:
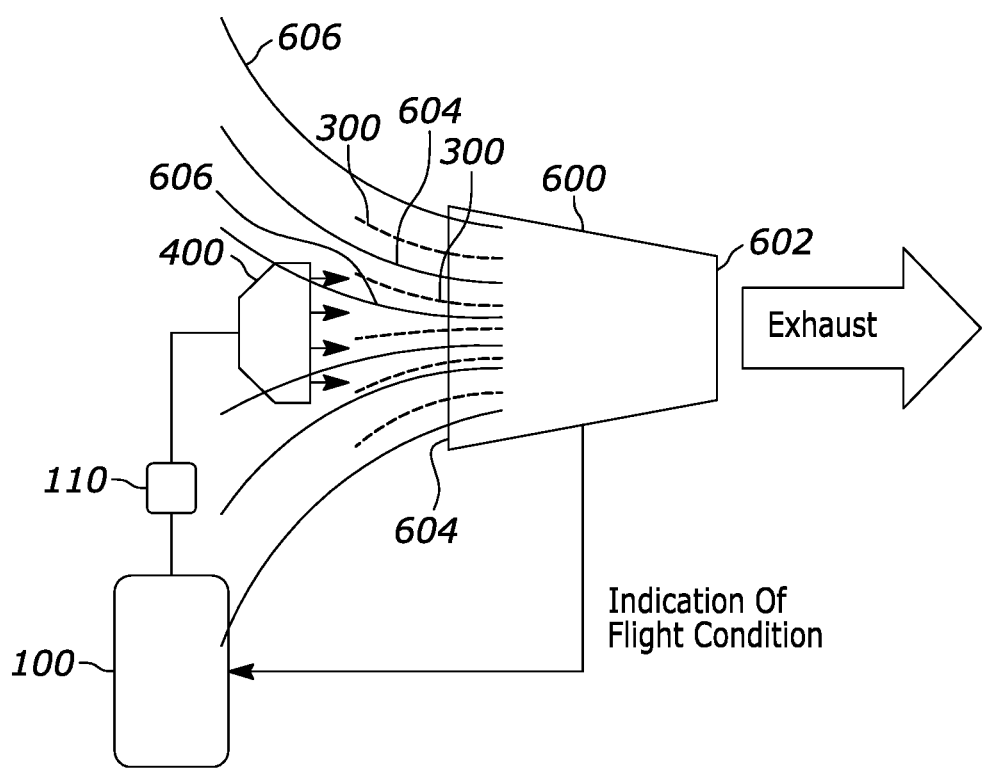
FIG. 6 shows a schematic diagram of control system for a turbine engine dust testing system in accordance with various embodiments of these teachings.

Turning now to FIG. 6, a schematic diagram of a control system for a turbine engine dust testing system is shown. As seen in FIG. 6, the dust injection test system 100 can operate in conjunction with a turbine engine 600 having an outlet 602 and an inlet 604. In particular, the dust nozzle array 400 is positioned proximate the inlet 604 such that the dust particulates 300, after being ejected from the dust nozzle array 400, are intermixed with ambient air 606 and sucked into the inlet 604 of the turbine engine 600. In some embodiments, the controller 109 (FIG. 1) can be configured to receive real-time operating parameter values from the turbine engine 600 that are indicative of a current testing flight condition of the turbine engine 600. Then, using the real-time operating parameter values and readings from a dust sensor 110, such as any of the dust sensors 110A, 110B, 110C described herein, the controller 109 can modify the flow rate of the dust particulates 300 into the dust nozzle array 400 so as to achieve a desired concentration of the dust particulates 300 in the ambient air 606 received in the inlet 604 (e.g., a concentration of the dust particulates 300 that is appropriate for the current testing flight conditions). In some embodiments, the controller 109 can modify, based on the operating condition of the turbine engine 600, the flow rate of the dust particulates 300 to the dust nozzle array 400 so as to provide a concentration of the dust particulates 300 in the ambient air 606 entering the inlet 604 in a range of about 20 parts per million to about 1000 parts per million. Furthermore, the controller 109 can be configured to maintain the actual concentration of the dust particulates 300 in the ambient air 606 to within a tolerance of approximately 35% of the desired concentration for a specific operating condition of the turbine engine 600.

In some embodiments, the real-time operating parameter values from the turbine engine 600 can include indications of a current power output, air flow rate, and operating condition of the turbine engine 600. From these values, the controller 109 can identify a desired flow rate of the dust particulates 300 that are associated with the current power output and operating condition of the turbine engine 600, and use a current value from one or more of the sensors 110A, 110B, 110C to determine whether a current flow rate of the dust particulates 300 differs from the desired flow rate of the dust particulates 300. If there is such a difference, the controller 109 can determine a new value for the flow rate of the slurry out of the tank 106 (FIG. 1) that would achieve the desire flow rate of the dust particulates 300 and direct the dust injection system 100 (e.g., via the pump 108 (FIG. 1)) to alter the slurry flow rate to conform to the new value.

Turning now to FIG. 7, a flow chart for a method 700 for ingestion testing with the dust injection test system 100 is shown. The method 700 includes activating 702 the pump 108 to supply the slurry of carrier liquid and dust particulates from the tank 106 to the injection nozzle 104. Next, the method 700 includes atomizing 704 the carrier liquid with the injection nozzle 104. The method 700 further includes injecting 706 the dust particulates 300 and carrier liquid as atomized into the fluid flow path 103 defined between the inlet 112 and the outlet 114 of the carrier pipe 102. As discussed above, in some embodiments, the method 700 can include a user input and directing, via the controller 109, the first flow rate of the pump 108 based on the user input.

Furthermore, in embodiments the sensors 110A, 110B, and/or 110C can be utilized in connection with the method 700 to provide a real-time feedback control process. For example, where the sensor 110A includes the scale, the method 700 can include receiving from the sensor 110A a current weight of the tank 106 as the indication of the amount of the dust particulates 300 flowing through the system 100. Then, the method 700 can include determining a current rate of change in the weight of the tank 106 over time by comparing the current weight of the tank 106 to one or more previous weights of the tank 106. In some embodiments, the previous weights can be stored in the non-volatile memory 113 electrically coupled to the controller 109. After the rate of change is determined, the method 700 can include determining a current flow rate of the dust particulates 300 through the system 100 from the current rate of change in the weight of the tank 106 over time. Finally, the method 700 can include altering, via the controller 109, the first flow rate based on a comparison of the current flow rate of the dust particulates 300 through the system with a desired flow rate of the dust particulates 300 through the system. In some embodiments, the desired flow rate of the dust particulates 300 through the system 100 is included with the user input.

Additionally, or alternatively, where the sensors 110B and/or 110C are the dust particulate sensors, the method 700 can include receiving, from the sensors 110B and/or 110C, a current amount of the dust particulates 300 detected proximate to the outlet 114 as the indication of the amount of the dust particulates 300 flowing through the system 100. The method 700 can include determining a current flow rate of the dust particulates 300 through the system 100 by comparing the current amount of the dust particulates 300 proximate to the outlet 114 to one or more previous amounts of the dust particulates 300 proximate to the outlet 114. As with the previous weights, the previous dust amount can be stored in the non-volatile memory 113 electrically coupled to the controller 109. After the current flow rate is determined, the method 700 can include altering, via the controller 109, the first flow rate based on a comparison of the current flow rate of the dust particulates 300 through the system 100*c* with the desired flow rate of the dust particulates 300 through the system 100. In embodiments where both the scale and dust particulate sensors are included, the method 700 can include determining the current flow rates in the manner described above and then taking an average of all determined rates for use in comparing against the desired flow rate.

Further aspects of the disclosure are provided by the subject matter of the following clauses:

A dust injection system for engine testing, the system comprising: a carrier pipe defining a fluid flow path between an inlet and an outlet; and an injection nozzle disposed within the carrier pipe between the inlet and the outlet, wherein the injection nozzle receives a slurry comprising dust particulates and carrier liquid, and injects the dust particulates and a carrier liquid into the fluid flow path, and wherein the carrier liquid is atomized and evaporates in the fluid flow path prior to the outlet to enable a dried version of the dust particulates to exit the outlet.

The system of any preceding clause further comprising: a tank that holds the slurry; a pump in fluid communication with the tank and the injection nozzle, wherein the pump delivers the slurry from the tank to the injection nozzle.

The system of any preceding clause further comprising a controller that directs a first flow rate of the pump based on a received user input.

The system of any preceding clause wherein the controller directs the first flow rate to produce a feed rate of the dust particulates in a range of 0.0004-0.01 lbs/min The system of any preceding clause further comprising a sensor electrically coupled to the controller that measures an indication of an amount of the dust particulates flowing through the system, and wherein the controller further directs the first flow rate based on the measured indication of the amount of the dust particulates flowing through the system.

The system of any preceding clause wherein the sensor comprises a scale, and wherein the indication of the amount of the dust particulates flowing through the system includes a weight of the tank measured by the scale.

The system of any preceding clause wherein the sensor comprises a dust particulate sensor electrically coupled to the controller and positioned in fluid flow path, and wherein the indication of the amount of the dust particulates flowing through the system includes an amount of the dust particulates detected by the dust particulate sensor.

The system of any preceding clause wherein the pump includes one of a peristaltic pump, a gear pump, a screw pump, or a gas pressurized vessel.

The system of any preceding clause wherein the carrier liquid includes one of ethanol, acetone, or isopropyl alcohol.

The system of any preceding clause wherein a mass ratio of the dust particulates to the carrier liquid in the slurry is in a range of 0.02-0.5.

The system of any preceding clause wherein the carrier pipe comprises a first section that includes the inlet, a second section that includes the outlet, and a connector between the first section and the second section, wherein the connector includes a support bracket that is coupled to the atomizer nozzle and positions the atomizer nozzle within fluid flow path.

The system of any preceding clause further comprising: a first gas source coupled to the inlet to provide a gas stream through the fluid flow path; and a second gas source in fluid communication with the injection nozzle to supply gas to the injection nozzle for use in atomizing the carrier liquid.

The system of any preceding clause wherein the sensor is integral to the pump.

The system of any preceding clause further comprising: providing a first pressurized gas at the inlet to define the fluid flow path; and providing an additional pressurized gas for atomizing the slurry at the exit of the injection nozzle.

A method for ingestion testing with a dust injection system, the method comprising: activating a pump to supply a slurry of carrier liquid and dust particulates from a tank to an injection nozzle; atomizing the carrier liquid; and injecting the dust particulates and carrier liquid into a fluid flow path defined between an inlet and an outlet of a carrier pipe with the injection nozzle, wherein the injection nozzle is disposed within the carrier pipe between the inlet and the outlet, and wherein the carrier liquid evaporates within the fluid flow path upstream of the outlet and exits the outlet in gas form along with the dust particulates.

The method of any preceding clause further comprising receiving a user input and directing, via a controller, a first flow rate of the pump based on the user input.

The method of any preceding clause further comprising: measuring, via a sensor electrically coupled to the controller, an indication of an amount of the dust particulates flowing through the system, and further directing, via the controller, the first flow rate based on the measured indication of the amount of the dust particulates flowing through the system.

The method of any preceding clause further comprising: receiving from the sensor a current weight of the tank as the indication of the amount of the dust particulates flowing through the system; determining a current rate of change in the weight of the tank over time by comparing the current weight of the tank to one or more previous weights of the tank; determining a current flow rate of the dust particulates through the system from the current rate of change in the weight of the tank over time; and altering, via the controller, the first flow rate based on a comparison of the current flow rate of the dust particulates through the system with a desired flow rate of the dust particulates through the system, the desired flow rate of the dust particulates through the system being included with the user input.

The method of any preceding clause further comprising: receiving, from the sensor, a current amount of the dust particulates proximate to the outlet as the indication of the amount of the dust particulates flowing through the system; determining a current flow rate of the dust particulates through the system by comparing the current amount of the dust particulates proximate to the outlet to one or more previous amounts of the dust particulates proximate to the outlet; and altering, via the controller, the first flow rate based on a comparison of the current flow rate of the dust particulates through the system with a desired flow rate of the dust particulates through the system, the desired flow rate of the dust particulates through the system being included with the user input.

The system or method of any preceding clause wherein the carrier liquid includes a liquid with a high vapor pressure relative to water under normal ambient operating conditions.

The system or method of any preceding clause wherein a vapor pressure of the carrier liquid is in a range of about 2.5 kilopascals to about 50 kilopascals.

The system or method of any preceding clause wherein the carrier liquid includes a flash point in a range of about-30 degrees Celsius to about 200 degrees Celsius.

The system or method of any preceding clause wherein the carrier liquid provides chemical stability when intermixed with the dust particulates.

The system or method of any preceding clause wherein the carrier liquid is non-polar.

A control system for a turbine engine dust testing system, the control system comprising: a dust injection system that delivers a flow rate of dust to a turbine engine being tested; a sensor that monitors a parameter indicative of the flow rate of the dust being delivered to the turbine engine; a controller that receives a current value of the parameter from the sensor and real-time operating parameter values from the turbine engine, and directs the dust injection system to alter the flow rate of the dust based on the current value of the parameter from the sensor and real-time operating parameter values from the turbine engine.

The control system of any preceding clause wherein the dust injection system includes a slurry-based dust feeder that delivers a slurry comprised of the dust and a carrier liquid to an injection nozzle to enable atomization and evaporation of the carrier liquid for delivery of the dust to the turbine engine absent the carrier liquid, and wherein the controller alters the flow rate of the dust by modifying a flow rate of the slurry to the injection nozzle.

The control system of any preceding clause wherein real-time operating parameter values from the turbine engine include indications of a current power output, air flow rate, and operating condition of the turbine engine, wherein the controller identifies a desired flow rate of the dust is associated with the current power output and operating condition of the turbine engine, uses a current value of the parameter from the sensor to determine a current flow rate of the dust, and wherein, when the controller determines that the current flow rate of the dust differs from the desired flow rate of the dust, the controller determines a new value of the slurry flow rate that would achieve the desire flow rate of the dust and directs the dust injection system to alter the slurry flow rate to conform to the new value.

A retrofit kit for a dust injection system for engine testing, the kit comprising: an injection nozzle; a tank configured to hold a slurry of dust particulates and carrier liquid; a pump configured to fluidly interface with the tank and the injection nozzle and to deliver the slurry from the tank to the injection nozzle at a selectable flow rate; a support bracket sized and shaped to couple to a connector of a carrier pipe and to support the injection nozzle within the carrier pipe.

The kit of any preceding clause further comprising a user interface configured to receive user input selecting the flow rate.

The kit of any preceding clause further comprising a controller configured to directs a first flow rate of the pump based on the user input.

The kit of any preceding clause wherein the controller directs the first flow rate to produce a feed rate of the dust particulates in a range of 0.0004-0.01 lbs/min.

The kit of any preceding clause further comprising a sensor configured to electrically couple to the controller, the sensor configured to measure an indication of an amount of the dust particulates flowing through the system, and wherein the controller further directs the first flow rate based on the measured indication of the amount of the dust particulates flowing through the system.

The kit of any preceding clause wherein the sensor comprises a scale, and wherein the indication of the amount of the dust particulates flowing through the system includes a weight of the tank measured by the scale.

The kit of any preceding clause wherein the sensor comprises a dust particulate sensor configured to electrically couple to the controller and be positioned in fluid flow path, and wherein the indication of the amount of the dust particulates flowing through the system includes an amount of the dust particulates detected by the dust particulate sensor.

The kit of any preceding clause wherein the pump includes one of a peristaltic pump, gear pump, screw pump, gas pressurized vessel.

The kit of any preceding clause wherein the carrier pipe comprises a first section that includes the inlet, a second section of pipe that includes the outlet, and a connector between the first section and the second section, wherein the connector includes a support bracket that is coupled to the injection nozzle and positions the injection nozzle within fluid flow path.

What is claimed is:
1. A dust injection system for engine testing, the system comprising:
a carrier pipe defining a fluid flow path between an inlet and an outlet; and an injection nozzle disposed within the carrier pipe between the inlet and the outlet, wherein the injection nozzle receives a slurry comprising dust particulates and a carrier liquid, and injects the dust particulates and carrier liquid into the fluid flow path, and wherein the carrier liquid is atomized and evaporates in the fluid flow path prior to the outlet to enable a dried version of the dust particulates to exit the outlet.

2. The system of claim 1 wherein the carrier liquid includes one of ethanol, acetone, or isopropyl alcohol.

3. The system of claim 1 wherein a mass ratio of the dust particulates to the carrier liquid in the slurry is in a range of 0.02-0.5.

4. The system of claim 1 wherein the carrier pipe comprises a first section that includes the inlet, a second section that includes the outlet, and a connector between the first section and the second section, wherein the connector includes a support bracket that is coupled to the injection nozzle and positions the injection nozzle within fluid flow path.

5. The system of claim 1 further comprising:
a first gas source coupled to the inlet to provide a gas stream through the fluid flow path; and
a second gas source in fluid communication with the injection nozzle to supply gas to the injection nozzle for use in atomizing the carrier liquid.

6. The system of claim 1 further comprising:
a tank that holds the slurry; and
a pump in fluid communication with the tank and the injection nozzle,
wherein the pump delivers the slurry from the tank to the injection nozzle.

7. The system of claim 6 wherein the pump includes one of a peristaltic pump, a gear pump, a screw pump, or a gas pressurized vessel.

8. The system of claim 6 further comprising a controller that directs a first flow rate of the pump based on a received user input.

9. The system of claim 8 wherein the controller directs the first flow rate to produce a feed rate of the dust particulates in a range of 0.0004-0.01 lbs/min.

10. The system of claim 8 further comprising a sensor electrically coupled to the controller that measures an indication of an amount of the dust particulates flowing through the system, and wherein the controller further directs the first flow rate based on the measured indication of the amount of the dust particulates flowing through the system.

11. The system of claim 10 wherein the sensor comprises a scale, and wherein the indication of the amount of the dust particulates flowing through the system includes a weight of the tank measured by the scale.

12. The system of claim 10 wherein the sensor comprises a dust particulate sensor electrically coupled to the controller and positioned in fluid flow path, and wherein the indication of the amount of the dust particulates flowing through the system includes an amount of the dust particulates detected by the dust particulate sensor.

13. A method for ingestion testing with a dust injection system, the method comprising:
activating a pump to supply a slurry of carrier liquid and dust particulates from a tank to an injection nozzle;
atomizing the carrier liquid; and
injecting the dust particulates and carrier liquid into a fluid flow path defined between an inlet and an outlet of a carrier pipe with the injection nozzle,
wherein the injection nozzle is disposed within the carrier pipe between the inlet and the outlet, and
wherein the carrier liquid evaporates within the fluid flow path upstream of the outlet and exits the outlet in gas form along with the dust particulates.

14. The method of claim 13 further comprising receiving a user input and directing, via a controller, a first flow rate of the pump based on the user input.

15. The method of claim 14 further comprising:
measuring, via a sensor electrically coupled to the controller, an indication of an amount of the dust particulates flowing through the system, and
further directing, via the controller, the first flow rate based on the measured indication of the amount of the dust particulates flowing through the system.

16. The method of claim 15 further comprising:
receiving from the sensor a current weight of the tank as the indication of the amount of the dust particulates flowing through the system;
determining a current rate of change in the weight of the tank over time by comparing the current weight of the tank to one or more previous weights of the tank;
determining a current flow rate of the dust particulates through the system from the current rate of change in the weight of the tank over time; and
altering, via the controller, the first flow rate based on a comparison of the current flow rate of the dust particulates through the system with a desired flow rate of the dust particulates through the system, the desired flow rate of the dust particulates through the system being included with the user input.

17. The method of claim 15 further comprising:
receiving, from the sensor, a current amount of the dust particulates proximate to the outlet as the indication of the amount of the dust particulates flowing through the system;
determining a current flow rate of the dust particulates through the system by comparing the current amount of the dust particulates proximate to the outlet to one or more previous amounts of the dust particulates proximate to the outlet; and
altering, via the controller, the first flow rate based on a comparison of the current flow rate of the dust particulates through the system with a desired flow rate of the dust particulates through the system, the desired flow rate of the dust particulates through the system being included with the user input.

18. A control system for a turbine engine dust testing system, the control system comprising:
a dust injection system that delivers a flow rate of dust to a turbine engine being tested;
a sensor that monitors a parameter indicative of the flow rate of the dust being delivered to the turbine engine; and
a controller that receives a current value of the parameter from the sensor and real-time operating parameter values from the turbine engine, and directs the dust injection system to alter the flow rate of the dust based on the current value of the parameter from the sensor and real-time operating parameter values from the turbine engine;
wherein the dust injection system includes a slurry-based dust feeder that delivers a slurry comprised of the dust and a carrier liquid to an injection nozzle to enable atomization and evaporation of the carrier liquid for delivery of the dust to the turbine engine absent the carrier liquid, and wherein the controller alters the flow rate of the dust by modifying a flow rate of the slurry to the injection nozzle.

19. The control system of claim 18 wherein real-time operating parameter values from the turbine engine include indications of a current power output, air flow rate, and operating condition of the turbine engine, wherein the controller identifies a desired flow rate of the dust is associated with the current power output and operating condition of the turbine engine, uses a current value of the parameter from the sensor to determine a current flow rate of the dust, and wherein, when the controller determines that the current flow rate of the dust differs from the desired flow rate of the dust, the controller determines a new value of the slurry flow rate that would achieve the desire flow rate of the dust and directs the dust injection system to alter the slurry flow rate to conform to the new value.

\* \* \* \* \*